(12) United States Patent
Takeuchi et al.

(10) Patent No.: US 8,842,314 B2
(45) Date of Patent: Sep. 23, 2014

(54) IMAGE PROCESSING APPARATUS CAPABLE OF WIRELESSLY EXCHANGING DATA, IMAGE PROCESSING METHOD CAPABLE OF WIRELESSLY EXCHANGING DATA, AND IMAGE PROCESSING PROGRAM CAPABLE OF WIRELESSLY EXCHANGING DATA

(75) Inventors: Yasuji Takeuchi, Kobe (JP); Tomoyuki Okamoto, Suita (JP); Nobuo Kamei, Osaka (JP); Tomo Tsuboi, Itami (JP)

(73) Assignee: Konica Minolta Business Technologies, Inc, Chiyoda-Ku, Tokyo (JP)

( * ) Notice: Subject to any disclaimer, the term of this patent is extended or adjusted under 35 U.S.C. 154(b) by 1354 days.

(21) Appl. No.: 12/400,881

(22) Filed: Mar. 10, 2009

(65) Prior Publication Data

US 2009/0303528 A1  Dec. 10, 2009

(30) Foreign Application Priority Data

Jun. 6, 2008 (JP) ................................ 2008-149982

(51) Int. Cl.
*G06F 3/12* (2006.01)
*H04L 29/06* (2006.01)
(Continued)

(52) U.S. Cl.
CPC ...... *G06F 3/1238* (2013.01); *H04N 2201/3205* (2013.01); *G06F 3/1222* (2013.01); *H04N 2201/3235* (2013.01); *H04L 63/08* (2013.01); *G06F 3/1205* (2013.01); *H04N 1/00474* (2013.01); *H04N 2201/3276* (2013.01); *H04N 2201/0094* (2013.01); *G06F 21/608* (2013.01); *G06F 3/1285* (2013.01); *H04N 2201/3207* (2013.01); *H04N 1/00307* (2013.01); *H04L 63/0492* (2013.01); *G06F 3/1258* (2013.01); *G06F 2221/2117* (2013.01); *H04N 1/32112* (2013.01); *H04N 1/00411* (2013.01); *H04N 2201/0048* (2013.01); *G06F 2221/2141* (2013.01); *H04N 1/00514* (2013.01)
USPC ...................................................... 358/1.15

(58) Field of Classification Search
USPC ................................................ 358/1.15, 1.13
See application file for complete search history.

(56) References Cited

U.S. PATENT DOCUMENTS 8,488,153 B2 * 7/2013 Anezaki et al. .............. 358/1.15
(Continued)

FOREIGN PATENT DOCUMENTS

JP  2004-297759  10/2004
(Continued)

OTHER PUBLICATIONS

Notification of Reasons for Refusal issued in corresponding Japanese Patent Application No. 2008-149982 dated Jun. 1, 2010, and an English Translation thereof.

*Primary Examiner* — Barbara Reinier
(74) *Attorney, Agent, or Firm* — Buchanan Ingersoll & Rooney (57) ABSTRACT

Identification information pieces used for establishment of a connection between an image processing apparatus and a portable terminal are generated and also linked to the data process conditions registered in advance. The generated identification information pieces are displayed on a display in a style allowing users to understand their linkages to the process conditions. Among those displayed thereon, a specific identification information piece is entered on the portable terminal and transmitted to the image processing apparatus, according to user instruction. Receiving the identification information piece, if the image processing apparatus judges that the identification information piece is appropriate, a connection between the image processing apparatus and the portable terminal is established by using the identification information piece, and then data processing is performed on the data to be processed and other data, under the process condition linked to the identification information piece used for establishment of the connection.

27 Claims, 7 Drawing Sheets

(51) Int. Cl.
*H04N 1/00* (2006.01)
*G06F 21/60* (2013.01)
*H04N 1/32* (2006.01)

(56) References Cited

U.S. PATENT DOCUMENTS

| | | | |
|---|---|---|---|
| 8,553,253 B2* | 10/2013 | Murayama | 358/1.15 |
| 8,687,214 B2* | 4/2014 | Kurahashi | 358/1.14 |
| 2004/0243920 A1* | 12/2004 | Kato | 715/500 |
| 2006/0148402 A1* | 7/2006 | Hagiwara | 455/41.1 |
| 2007/0195364 A1* | 8/2007 | Umehara et al. | 358/1.15 |
| 2007/0201081 A1 | 8/2007 | Murayama | |
| 2007/0201389 A1 | 8/2007 | Murayama | |

FOREIGN PATENT DOCUMENTS

| | | |
|---|---|---|
| JP | 2006-121726 A | 5/2006 |
| JP | 2007-108947 A | 4/2007 |
| JP | 2007-157084 A | 6/2007 |
| JP | 2007-223222 | 9/2007 |
| JP | 2007-228419 | 9/2007 |

* cited by examiner

User : mike

| Setting Name | PIN Code | Multi-page | Staple | Punch | Sheet Feed Tray | Discharge Tray | Print Type | Sheet Type | Number of Sets |
|---|---|---|---|---|---|---|---|---|---|
| Mike-default | | 1 in 1 | Left-hand Corner | OFF | Automated | Tray-1 | Single-side | Plain Paper | 1 |
| Mike-Normal | | 2 in 1 | Left-hand Corner | OFF | Automated | Tray-1 | Both-side | Plain Paper | 1 |
| Mike-NoStaple | | 1 in 1 | OFF | OFF | Automated | Tray-1 | Single-side | Plain Paper | 1 |

FIG.3

User : mike

| Setting Name | PIN Code | Multi-page | Staple | Punch | Sheet Feed Tray | Discharge Tray | Print Type | Sheet Type | Number of Sets |
|---|---|---|---|---|---|---|---|---|---|
| Mike-default | 1234 | 1 in 1 | Left-hand Corner | OFF | Automated | Tray-1 | Single-side | Plain Paper | 1 |
| Mike-Normal | 3086 | 2 in 1 | Left-hand Corner | OFF | Automated | Tray-1 | Both-side | Plain Paper | 1 |
| Mike-NoStaple | 8365 | 1 in 1 | OFF | OFF | Automated | Tray-1 | Single-side | Plain Paper | 1 |

| Device Default | 6846 | 1 in 1 | | OFF | Automated | Tray-1 | Single-side | Plain Paper | 1 |

IMAGE PROCESSING APPARATUS CAPABLE OF WIRELESSLY EXCHANGING DATA, IMAGE PROCESSING METHOD CAPABLE OF WIRELESSLY EXCHANGING DATA, AND IMAGE PROCESSING PROGRAM CAPABLE OF WIRELESSLY EXCHANGING DATA

This application claims priority under 35 U.S.C. §119 to Japanese Patent Application No. 2008-149982 filed on Jun. 6, 2008, the entire disclosure of which is incorporated herein by reference in its entirety.

BACKGROUND OF THE INVENTION

1. Field of the Invention

The present invention relates to an image processing apparatus that is applied to an image forming apparatus or etc. that is capable of wirelessly exchanging data with a user's portable terminal, an image processing method that is implemented by the image processing apparatus, and an image processing program that is recorded in a computer readable recording medium to make a computer of the image processing apparatus implement the image processing method.

2. Description of the Related Art

The following description sets forth the inventor's knowledge of related art and problems therein and should not be construed as an admission of knowledge in the prior art.

As disclosed in Japanese Unexamined Laid-open Patent Publication No. 2007-157084, there has been an image processing apparatus such as a MFP (Multi Function Peripheral) that is a multifunctional digital machine, capable of receiving the data to be processed such as the data to be printed out, from a portable terminal such as a cell-phone, by using a near-field wireless communication system such as Bluetooth, and capable of performing data processing on the received data.

In order to perform data processing on the data to be processed, which is transmitted from the portable terminal, by using the image processing apparatus as in the way above, it is necessary to establish a connection between the portable terminal and the image processing apparatus then transmit the data to be processed, to the image processing apparatus from the portable terminal. It is also necessary to set on the image processing apparatus, a process condition under which data processing is performed on the data to be processed.

Therefore, in a conventional manner, users have to perform an operation to establish a connection between the portable terminal and the image processing apparatus, and also an operation to set a process condition on the image processing apparatus, separately.

As disclosed in Japanese Unexamined Laid-open Patent Publication No. 2006-121726, there has been a technology to establish a connection between a user's cell-phone and a device capable of performing a communication using identification information such as a PIN code by using a near-field wireless communication system.

However, it is troublesome and inconvenient for users to perform an operation to establish a connection between the cell-phone and the image processing apparatus, and also an operation to set a process condition, separately.

Meanwhile, in order to omit an operation to set a process condition, a process condition can be set on the image processing apparatus, as the default setting. However, respective image processing apparatuses usually have different default settings configured thereon, and if the default setting is not equivalent to a user's preferable process condition, this user eventually has to perform an operation to change it, which is still troublesome and does not improve user operability.

Thus, it is undeniable that the technology described in Japanese Unexamined Laid-open Patent Publication No. 2006-121726 does not give a perfect resolution against the above-mentioned problems.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image processing apparatus that improves usability and operability by simplifying user operations when the image processing apparatus performs data processing on the data to be processed, which is obtained from a portable terminal.

It is another object of the present invention to provide an image processing method that improves usability and operability by simplifying user operations when the image processing apparatus performs data processing on the data to be processed, which is obtained from a portable terminal.

It is yet another object of the present invention to provide an image processing program recorded in a computer readable recording medium to make a computer of the image processing apparatus execute processing by the image processing method.

According to a first aspect of the present invention, an image processing apparatus includes:
  a wireless communicator that is capable of communicating with a user's portable terminal, wirelessly;
  a register that registers one or more than one process conditions under which data processing is performed;
  an identification information generator that generates identification information for the registered process condition and also links the identification information to the registered process condition, before establishment of a connection with the user's portable terminal;
  a display that displays on itself, the generated identification information in a style that allows users to understand its linkage to the process condition;
  a connection controller that establishes a connection with the portable terminal, if identification information entered by the user via the portable terminal then received therefrom is equivalent to the generated identification information; and
  a data processor that performs data processing on the data to be processed, which is received from the portable terminal having been connected, or which is obtained according to storage information received from the portable terminal, under the process condition that is linked to the identification information used for establishment of the connection.

According to a second aspect of the present invention, an image processing method of the image processing apparatus includes:
  registering one or more than one process conditions under which data processing is performed;

generating identification information for the registered process condition and also linking the identification information to the registered process condition, before establishing a connection between a user's portable terminal and an image processing apparatus in order to enable them to communicate with each other, wirelessly;

displaying on a display, the generated identification information in a style that allows users to understand its linkage to the process condition;

establishing a connection between the portable terminal and the image processing apparatus, if identification information entered by the user via the portable terminal then received therefrom is equivalent to the generated identification information; and performing data processing on the data to be processed, which is received from the portable terminal having been connected to the image processing apparatus, or which is obtained according to storage information received from the portable terminal, under the process condition that is linked to the identification information used for establishment of the connection.

According to a third aspect of the present invention, an image processing program is recorded in a computer readable recording medium to make a computer of the image processing apparatus execute:

registering one or more than one process conditions under which data processing is performed;

generating identification information for the registered process condition and also linking the identification information to the registered process condition, before establishing a connection between a user's portable terminal and an image processing apparatus in order to enable them to communicate with each other, wirelessly;

displaying on a display, the generated identification information in a style that allows users to understand its linkage to the process condition;

establishing a connection between the portable terminal and the image processing apparatus, if identification information entered by the user via the portable terminal then received therefrom is equivalent to the generated identification information; and performing data processing on the data to be processed, which is received from the portable terminal having been connected to the image processing apparatus, or which is obtained according to storage information received from the portable terminal, under the process condition that is linked to the identification information used for establishment of the connection.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
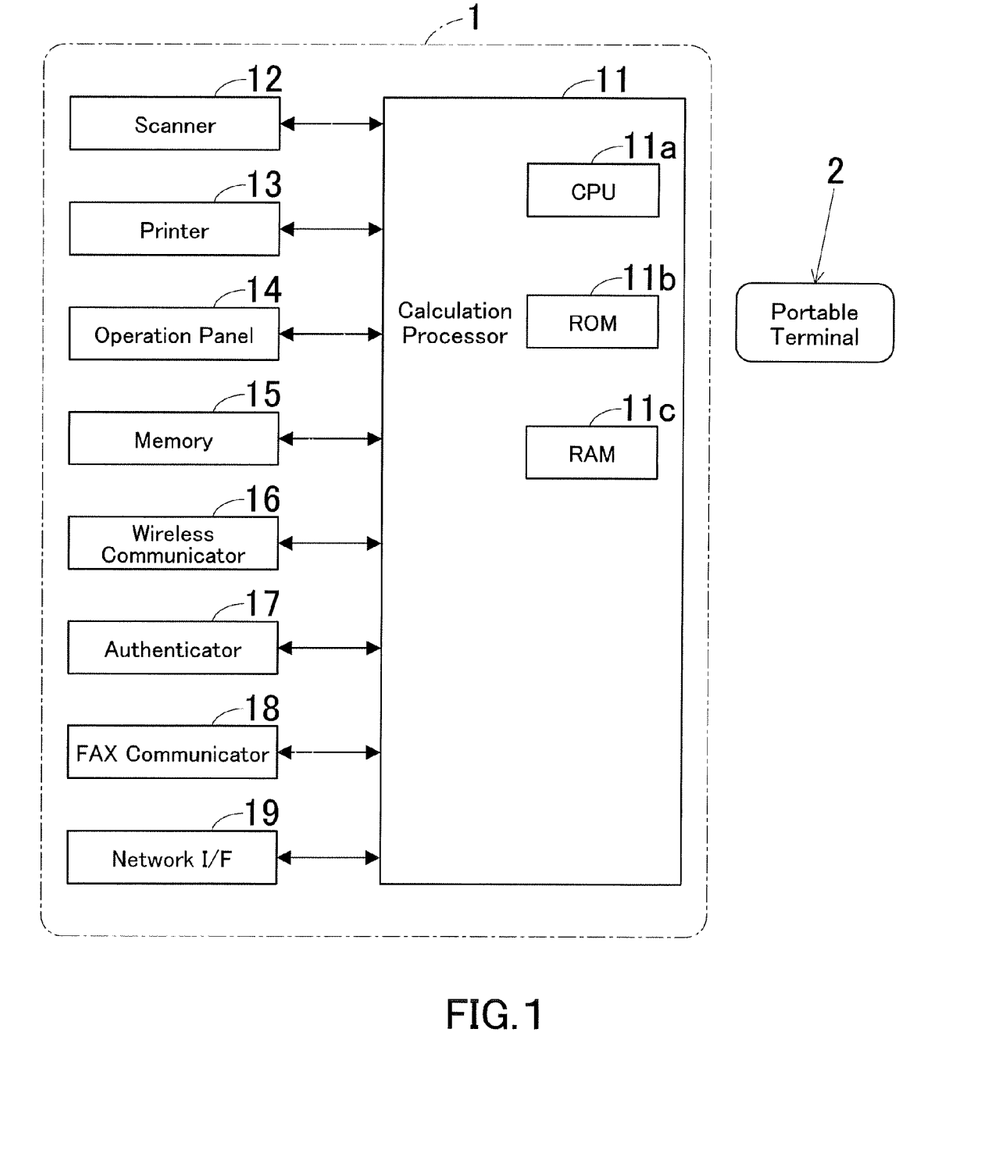
FIG. 1 is a block diagram showing a functional configuration of an image processing apparatus according to one embodiment of the present invention.

FIG. 1 is a block diagram showing a functional configuration of an image processing apparatus according to one embodiment of the present invention. In this embodiment, a MFP that is a multifunctional digital machine collectively having many functions such as the copy function, the print function, the facsimile function, and the data transmission function to transmit data to other apparatuses, is employed as the image processing apparatus, as described above. However, the image processing apparatus is not limited to a MFP, and also can be a copier, a printer or a facsimile, for example.

As shown in FIG. 1, an image processing apparatus 1 includes a calculation processor 11, a scanner 12, a printer 13, an operation panel 14, a memory 15, a wireless communicator 16, an authenticator 17, a facsimile (FAX) communicator 18, a network interface (network I/F) 19, and etc.

The calculation processor 11 includes a CPU 11a, a ROM 11b and a RAM 11c.

The CPU 11a centrally controls the entire image processing apparatus 1. The ROM 11b is a memory that stores in itself an operation program for the CPU 11a and other data. The RAM 11c is a memory that provides an operation area for the CPU 11a to execute an operation program.

The scanner 12 reads at a predetermined resolution, an image on a document that is set on a platen glass or an automatic document feeder (neither shown in Figures), then converts the image into image data that is electronic data, by performing image processing in a predetermined manner. The scanner 12 includes a light source, a prism, a CCD and etc.

The printer 13 prints out on sheets, image data read out from a document by the scanner 12 and print data received from external apparatuses such as a portable terminal 2 and a personal computer. The printer 13 is constructed of an electrophotographic machinery, an inkjet machinery or a thermal transfer machinery, for example.

Figure 2:
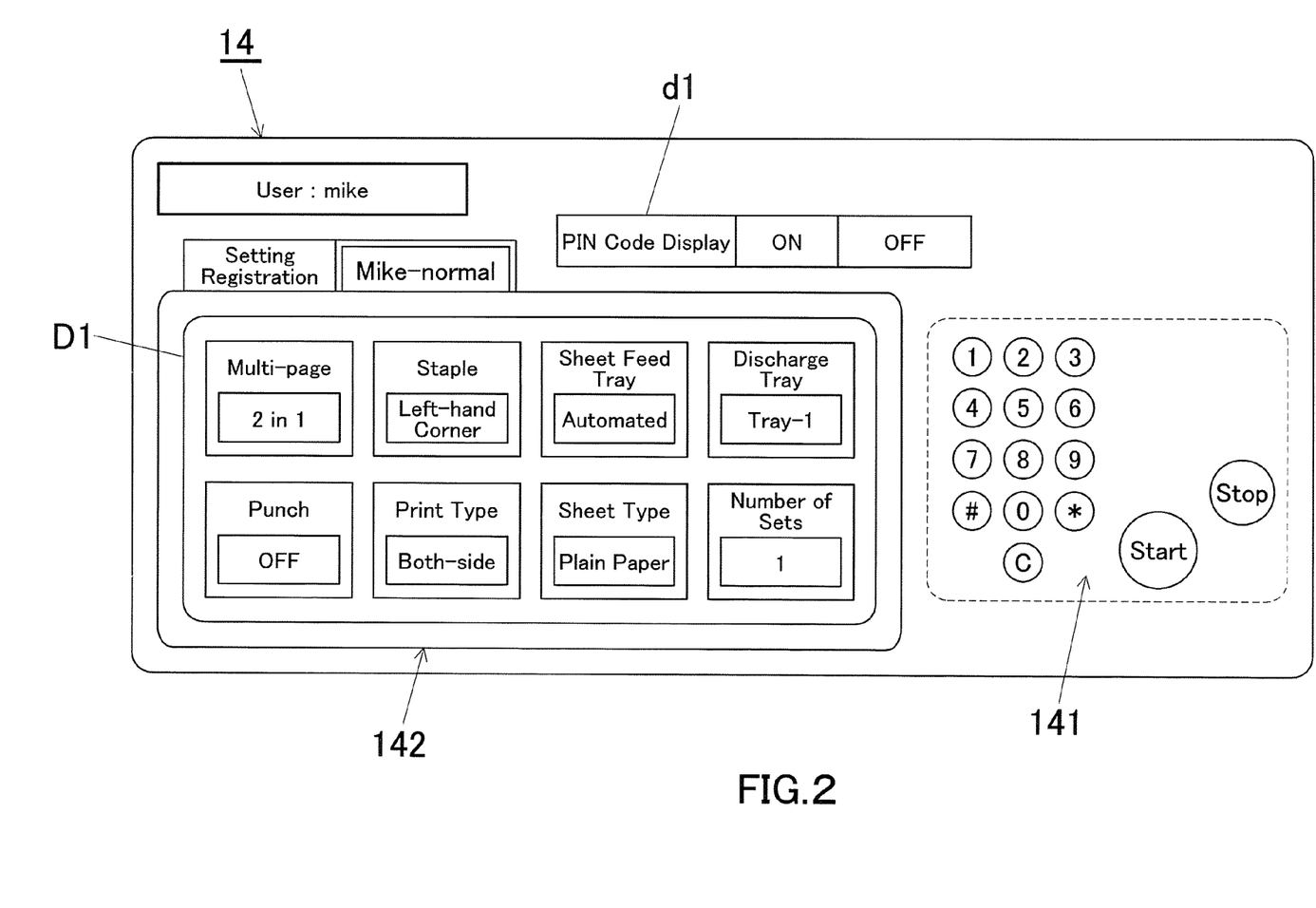
FIG. 2 is a view showing an example of a registration screen displayed on a display of an operation panel when a user performs an operation to register a print setting.

The operation panel 14 includes a key portion 141 having a start key, numeric keys and other keys for users to enter various instructions and a display 142 that is constructed of a liquid crystal display with touch-panel functionality, which displays on itself, messages, various entry screens and other information for users, as shown in FIG. 2. When a user intends to wirelessly communicate with the portable terminal 2 via the wireless communicator 16, the display 142 displays on itself, identification information that is used to establish a connection between the portable terminal 2 and the image processing apparatus 1, in a style that allows the user to understand a linkage between the identification information and a process condition such as a print condition. In this regard, detailed explanation will be provided later.

The memory 15 records in itself various data and software, and is constructed of a hard disk drive (HDD), a nonvolatile memory or etc. One or more than one process conditions including their details and setting names are registered and stored for each user, in a storage area of the memory 15, which is related to each user. Also, a default process condition initially set on the image processing apparatus 1 is stored therein.

The wireless communicator 16 serves to wirelessly connect to a network and wirelessly communicate with the portable terminal 2 existing in the vicinity. In this embodiment, the wireless communicator 16 performs a wireless communication by using Bluetooth, but it may perform a wireless communication by using a wireless communication system other than Bluetooth. Once the wireless communicator 16 establishes a connection between the image processing apparatus 1 and the portable terminal 2 by using Bluetooth, those are enabled to exchange data with each other.

The authenticator 17 authenticates users intending to log in the image processing apparatus 1. Internal authentication may be performed by the image processing apparatus 1, or external authentication may be performed by an authentication server or etc.

The facsimile communicator 18 exchanges data by facsimile. The network interface 19 exchanges data via a network that is wiredly connected thereto and not shown in Figures.

The calculation processor 11 controls operations performed by the functions ordinarily expected for the image processing apparatus 1, such as a copy operation, a print operation, a facsimile operation and other operations and also controls other operations to be explained as below, by the CPU 11a's executing an operation program stored in the ROM 11b or another recording medium. That is, as many identification information pieces that are used to establish a connection between the portable terminal 2 and the image processing apparatus 1 as the number of process conditions, are generated, and the identification information pieces and the process conditions are interlinked then stored in the memory 15. In this embodiment, since Bluetooth is employed as the wireless communication system, PIN codes are generated as the identification information pieces.

Furthermore, under the control of the calculation processor 11, the generated PIN codes and the process conditions are displayed on the display 142 of the operation panel 14, in a style that allows users to understand linkages between them. Referring to the display, a user enters on the portable terminal 2, a PIN code that is linked to his/her preferable process condition, and performs an operation to transmit the PIN code to the image processing apparatus 1. Subsequently, under the control of the calculation processor 11, it is judged whether or not the received PIN code is equivalent to the PIN code created by the processor itself. If the received PIN code is equivalent thereto, a connection between the wireless communicator 16 and the portable terminal 2 is established and the process condition liked to the received PIN code is set as the process condition under which data processing is performed on the data to be processed, and then data processing is performed on the data to be processed under the set process condition.

The image processing apparatus 1 may receive the data to be processed, directly from the portable terminal 2 having been connected to the image processing apparatus 1. Alternatively, the image processing apparatus 1 may obtain the data to be processed by accessing a storage location holding the data according to storage information indicating the storage location, which is received from the portable terminal 2. For example, the data to be processed is stored in a memory (a HDD, for example) of a server or a user's personal computer, and the storage information may indicate a path or a URL guiding the storage location of the memory, in which the data to be processed is stored.

Data processing performed on the data to be processed is not limited to a specific type particularly, and may be print processing facsimile transmission pricessing, or data transmission processing using e-mail or etc. The preliminarily registered process conditions may be print process conditions (also referred to "print settings"), facsimile transmission process conditions or data transmission process conditions that include address settings and etc. In an example to be explained hereinafter, print processing is employed as the data processing and print settings are employed as the process conditions.

A cell-phone, a PDA (Personal Digital Assistant) or etc. that is capable of performing a wireless communication by using Bluetooth can be employed as the portable terminal 2.

FIG. 2 is a view showing an example of a registration screen displayed on the display 142 of the operation panel 14, when a user performs an operation to register a print setting.

In this registration screen D1, details of a print setting to be registered by a user (user name: Mike), are displayed.

There displayed print setting items such as "Multi-page", "Staple", "Sheet-feed Tray", "Discharge Tray", "Punch", "Print Type", "Sheet Type" and "Number of Sets". Via this screen, the user selects his/her preferable one among optional conditions about the respective print setting items, by touch operation.

A set of buttons d1 in this screen D1, indicating as "PIN Code Display: 'display', 'not display'", is used by users to select via the screen D1, whether or not a PIN code should be displayed with its linkage to a print setting. If the button "PIN Code Display: 'display'" is selected, a generated PIN code and a registered print setting will be displayed in pair. Meanwhile, if the button "PIN Code Display: 'not display'" is selected, only one generated PIN code is displayed without its linkage to a process condition.

Figure 3:
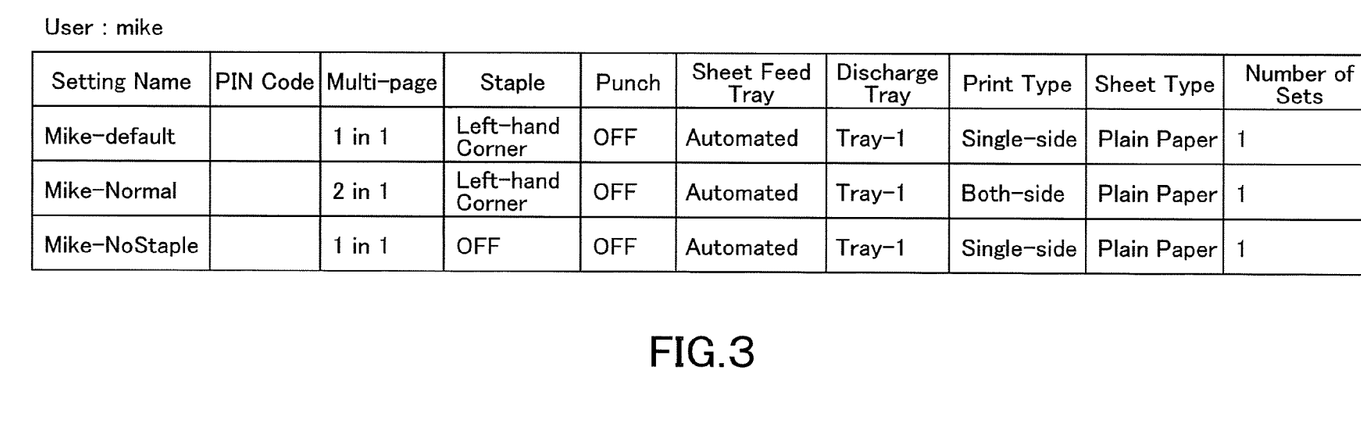
FIG. 3 shows a table having details of the print settings that are registered in a memory via the registration screen shown in FIG. 2.

FIG. 3 shows a table having details of the print settings that are registered in the memory 15 via the registration screen D1 shown in FIG. 2. When a user (user name: mike) enters a print setting and a setting name, those are interlinked then registered therein. Print settings registered in this way above are administered for respective users.

Since print settings and setting names are interlinked then registered, a print setting can be uniquely specified by selecting its title. In this table of FIG. 3, three print settings are registered with the setting names "Mike-default", "Mike-Normal" and "Mike-NoStaple". Since PIN codes are not yet registered for the print settings, the column for PIN Codes is still blank.

Figure 4:
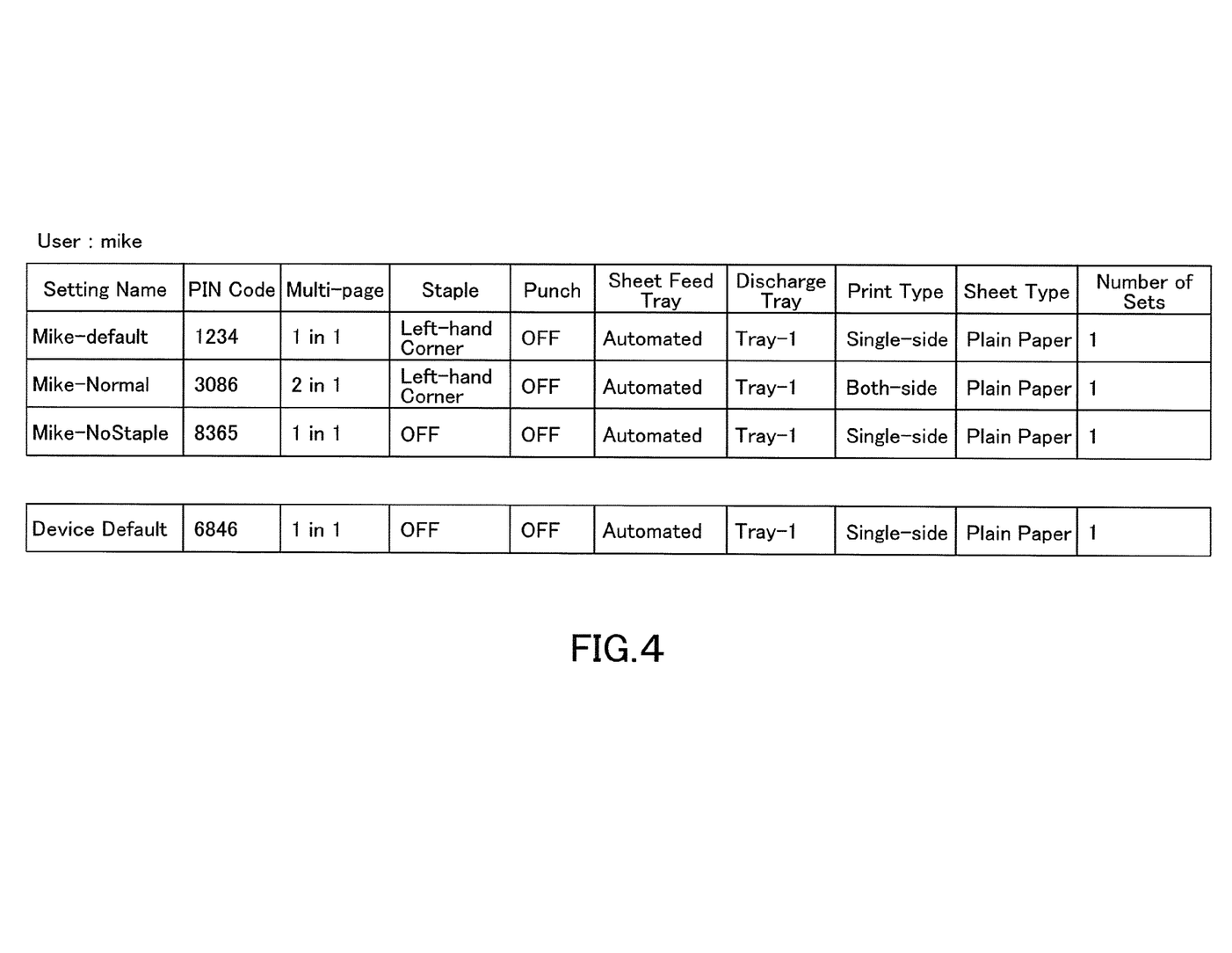
FIG. 4 shows a table having details of the print settings that are registered therein after generation of PIN codes.

FIG. 4 shows a table having details of the print settings that are registered therein after generation of PIN codes. As shown in this table, different PIN codes are linked to the respective print settings. In this embodiment shown in FIG. 4, PIN codes are not only generated to be linked to print settings of a login user, but also generated to be linked to default print settings initially configured on the image processing apparatus 1.

Figure 5:
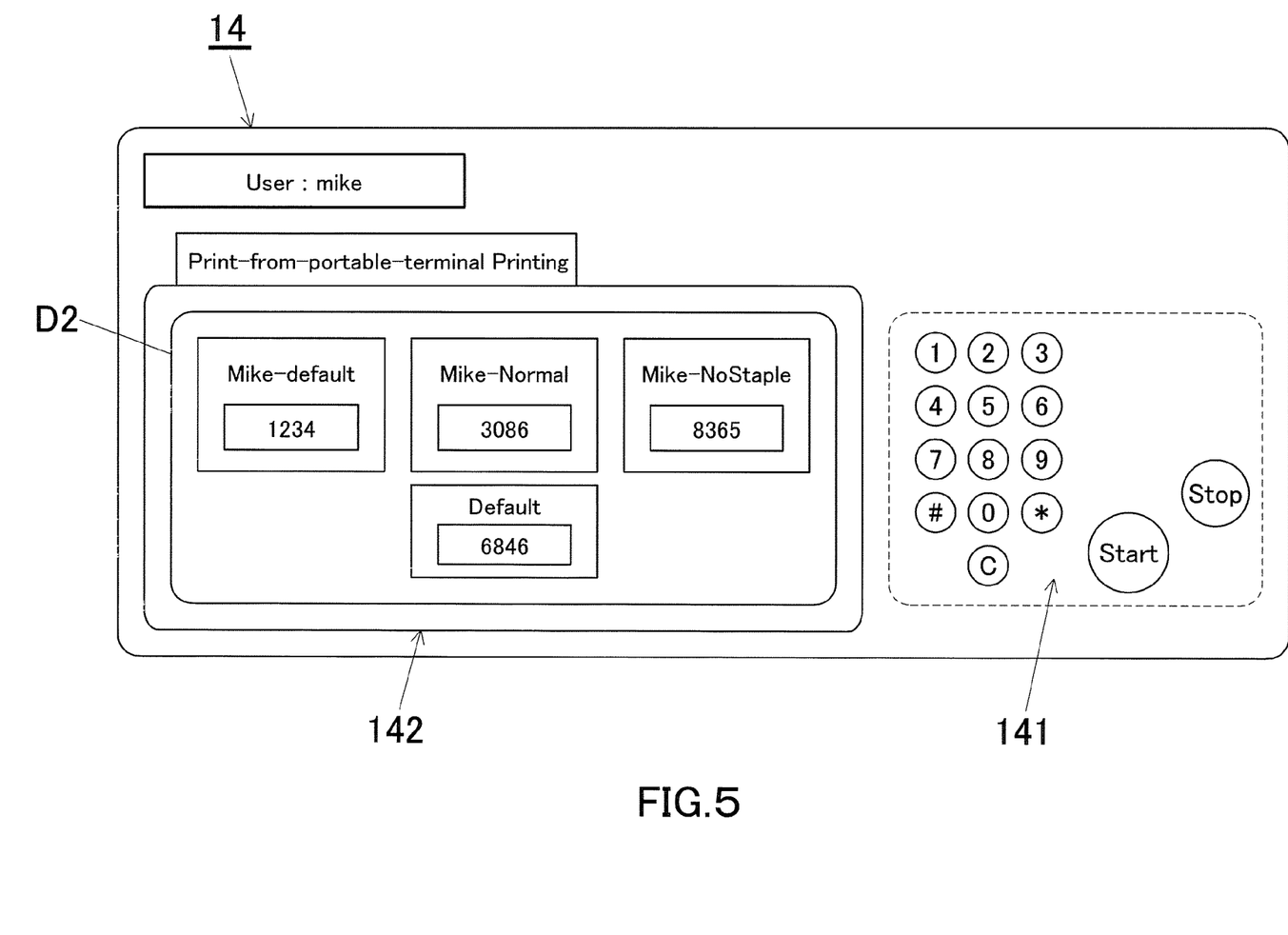
FIG. 5 is a view showing an example of a screen that displays in itself, the registered print settings and the PIN codes in a style that allows users to understand linkages between the print settings and the PIN codes.

FIG. 5 is a view showing an example of a screen displayed on the display 142 of the operation panel 14, in which the registered print settings and PIN codes are shown in a style that allows users to understand linkages between the print settings and the PIN codes when a connection between the portable terminal 2 and the image processing apparatus 1 is established by using Bluetooth.

In this embodiment, for a user (user name: Mike), three print setting are preliminarily registered and stored with the setting names "Mike-default", "Mile-Normal" and "Mike-NoStaple", and the setting names and the PIN codes linked thereto are displayed in pairs, as shown in FIGS. 3 and 4. Also, a default print setting and a PIN code linked thereto are displayed thereon.

As described above, PIN codes and setting names are displayed with linkages between them. Referring to the display, a user selects and enters a PIN code that is linked to his/her preferable print setting, then performs an operation to transmit the PIN code to the image processing apparatus 1. Receiving the PIN code, the image processing apparatus 1 judges whether or not the received PIN code is equivalent to any of the PIN codes created by the apparatus itself, and if it is equivalent to any, a wireless connection is established by using Bluetooth. Also, a print setting that is linked to the received PIN code is figured out and the print setting is set for the data to be printed out, then print processing is performed under the print setting.

To summarize, it is only necessary that a user selects and enters on the portable terminal 2, his/her preferable PIN code among those displayed on the display 142, and performs an operation to transmit it to the image processing apparatus 1. And thus, a print setting that is linked to the entered PIN code is automatically set thereon, and the data to be printed out is printed out under the print setting. This means that users do not have any more to enter a PIN code and also perform an operation to set a print setting on the image processing apparatus 1, separately, as in the conventional practice. By simplifying user operations in this way, an image processing apparatus improves its usability and operability.

Furthermore, as described above in this embodiment, a PIN code is generated for a default print setting initially configured on the image processing apparatus 1, then displayed. And thus, even if a user did not register any print settings for his/herself, he/she can select the default print setting, under which print processing is performed.

Meanwhile, if a user selects the button "PIN code display: 'not display'" via the registration screen displayed on the operation panel 14 of FIG. 2, when registers a print setting, a PIN code and a print setting are not displayed in pair, but only one PIN code is displayed and he/she has to perform an operation to set a print setting as in the conventional manner.

In the screen shown in FIG. 5, PIN codes and setting names are displayed in pairs. Alternatively, details of print settings may be entirely displayed in the screen, as shown in FIG. 4. In this case, users are allowed to view details of the print settings at one glance and select a PIN code more easily. It is also an advantage of the screen of FIG. 5, that setting names and PIN codes are displayed more simply in pairs.

Furthermore, if a user touches a button related to a pair of a setting name and a PIN code, via the screen of FIG. 5, details of the print setting may be displayed.

Hereinafter, a procedure executed in the image processing apparatus 1, to register a print setting, will be explained with reference to a flowchart shown in FIG. 6.

This procedure is executed by the CPU 11a of the calculation processor 11 of the image processing apparatus 1, according to an operation program recorded in a recording medium such as the ROM 11b.

Figure 6:
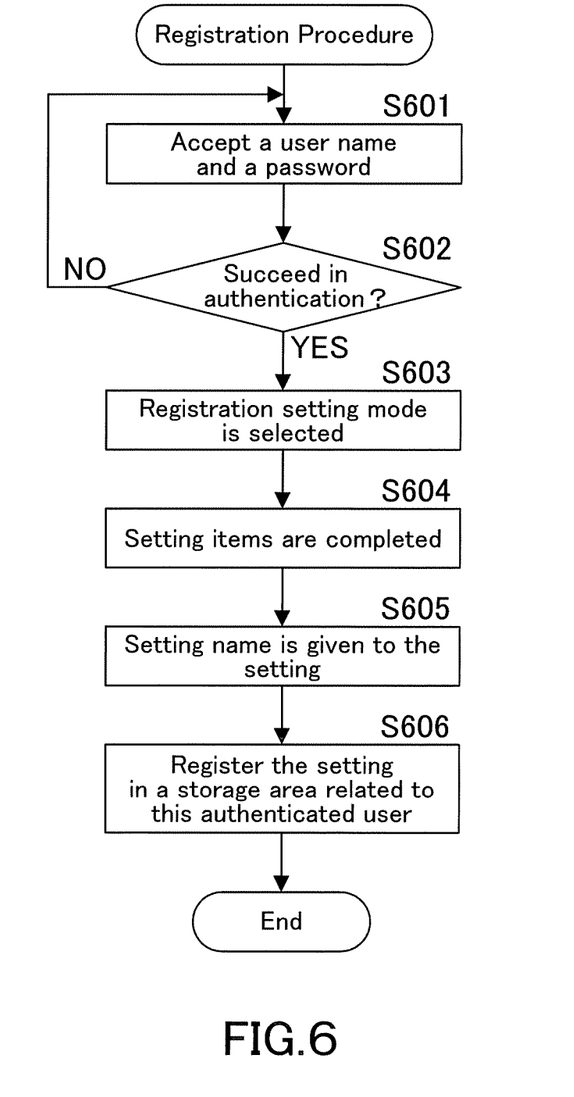
FIG. 6 is a flowchart representing a registration procedure executed in the image processing apparatus when a user performs an operation to register a print setting.

As shown in FIG. 6, a user enters his/her user name and password via the operation panel 14, intending to log in the image processing apparatus 1, and this entry is accepted in Step S601. Then, the authenticator 17 performs user authentication based on the accepted user name and password, and it is judged in Step S602, whether or not the user authentication succeeds. If the user authentication fails (NO in Step S602), the routine goes back to Step S601. If the user authentication succeeds (YES in Step S602), the routine proceeds to Step S603.

In Step S603, the "registration setting mode" is selected according to user instruction. Then, a print setting is configured by completing the respective print setting items such as "Multi-page" and "Staple", in Step S604.

After completion of the configuration, the user enters a title with which the print setting will be stored (a setting name), and the entered setting name is given to the print setting in Step S605.

Subsequently in Step S606, the print setting having the setting name given thereto is registered and stored in a storage area of the memory 15, which is related to this authenticated user. And then, the routine terminates.

If he/she intends to register a plurality of print settings sequentially, the routine repeats the Steps s603 through S606.

Figure 7:
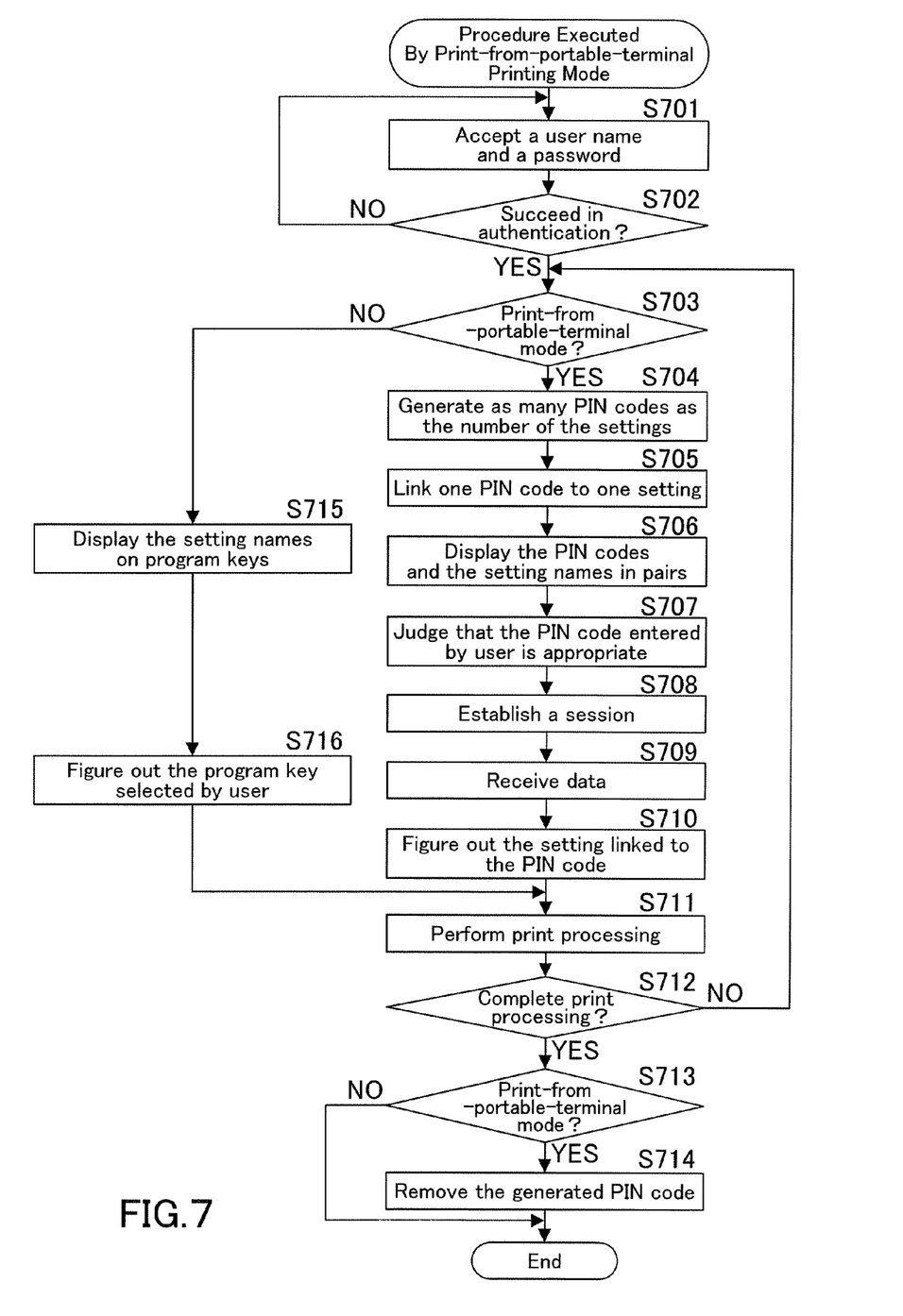
FIG. 7 is a flowchart representing a procedure executed in the image processing apparatus, when a mode (print-from-portable-terminal mode) that allows users to make the image processing apparatus print out the data to be processed, by transmitting the data from a cell-phone to the image processing apparatus, is employed.

FIG. 7 is a flowchart representing a procedure executed in the image processing apparatus 1, by a mode (print-from-portable-terminal mode) that allows users to make the image processing apparatus 1 print out data to be printed out, by transmitting the data from the portable terminal 2 to the image processing apparatus 1.

This procedure is also executed by the CPU 11a of the calculation processor 11 of the image processing apparatus 1, according to an operation program recorded in a recording medium such as the ROM 11b.

A user enters his/her user name and password via the operation panel 14, intending to log in the image processing apparatus 1, and this entry is accepted in Step S701. Then, the authenticator 17 performs user authentication based on the accepted user name and password, and it is judged in Step S702, whether or not the user authentication succeeds. If the user authentication fails (NO in Step S702), the routine goes back to Step S701. If the user authentication succeeds (YES in Step S702), the routine proceeds to Step S703.

In Step S703, it is judged whether or not the user selects the "print-from-portable-terminal mode" via the operation panel 14. If he/she does not select the "print-from-portable-terminal mode" (NO in Step S703), the routine proceeds to Step S715, in which program keys indicating the registered print setting names are displayed on the display 142 of the operation panel 14. And the user selects a program key indicating his/her preferable print setting among those displayed thereon. And then, the selected program key is figured out in Step S716. After that, the routine proceeds to Step S711, in which an operation related to the selected program key is performed.

On the other hand, if the user selects the "print-from-portable-terminal mode" in Step S703 (YES in Step S703), then in Step S704, as many PIN codes as the number of the print settings registered and stored for this login user are generated, and a PIN code is generated for the default print setting. In Step S705, one PIN code is linked to one print setting. Subsequently in Step S706, the PIN codes and the setting names of the print settings that are linked to the PIN codes are displayed in pairs on the display 142 of the operation panel 14, as shown in FIG. 5. As previously described, details of the print settings may be displayed thereon with their linkages to the PIN codes, as shown in FIG. 4.

As described above in this embodiment, PIN codes are generated and linked to the print settings that are registered for a login user. This would eliminate the possibility that the login user would happen to select a print setting that is registered for another user. However, it also can be configured such that PIN codes are further generated and linked to the print settings that are registered for a user other than the login user, and in addition to these PIN codes, the PIN codes that are linked to the print settings registered for the login user are displayed thereon. In this case, it is advantageous that the login user also can use a print setting registered for another user.

The user selects his/her preferable print setting among those displayed on the display 142 and enters on the portable terminal 2, a PIN code that is linked to the selected print setting, and then performs an operation to transmit the PIN code to the image processing apparatus 1. Receiving the PIN code via the wireless communicator 16, the image processing apparatus 1 judges in Step S707, whether or not the PIN code entered by the user on the portable terminal 2 is appropriate, in other words, the entered PIN code is equivalent to any of the PIN codes generated by the image processing apparatus 1 itself.

If the PIN code entered by the user is equivalent to any of the PIN codes generated by the image processing apparatus 1 itself, a connection (session) with the portable terminal 2 is established in Step S708, and data to be printed out is received from the portable terminal 2 in Step S709. If the PIN code entered by the user is not appropriate, no connection is established, however, a connection failure message may be displayed on the display 142 at the same time.

After reception of the data to be printed out, the print setting that is linked to the PIN code entered by the user is figured out in Step S710. And the data to be printed out is printed out under the figured-out print setting, in Step S711.

Subsequently in Step S712, it is judged whether or not the print processing is completed. If the print processing is not completed yet (NO in Step S712), the routine goes back to Step S703.

If the print processing is completed (YES in Step S712), then it is judged in Step S713, whether or not the "print-from-portable-terminal mode" is currently employed. If the "print-from-portable-terminal mode" is currently employed (YES in Step S713), the generated PIN code is removed from the memory 15 in Step S714, then the routine terminates. If the "print-from-portable-terminal mode" is not currently employed (NO in Step S713), the routine immediately terminates.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
   a wireless communicator that is capable of communicating with a user's portable terminal, wirelessly;
   a register that registers one or more than one process conditions under which data processing is performed;
   an identification information generator that generates identification information for at least one of the registered process conditions and also links the identification information to the at least one of the registered process conditions, before establishment of a connection with the user's portable terminal;
   a display that displays on itself, the generated identification information in a style that allows users to understand its linkage to the at least one of the registered process conditions;
   a connection controller that establishes a connection with the portable terminal, if identification information entered by the user via the portable terminal received therefrom is equivalent to the displayed generated identification information; and
   a data processor that performs data processing on the data to be processed, which is received from the portable terminal having been connected, or which is obtained according to storage information received from the portable terminal, under the at least one of the registered process conditions that is linked to the displayed identification information used for establishment of the connection.

2. The image processing apparatus recited in claim 1, wherein the wireless communicator uses Bluetooth, and the identification information corresponds to a PIN code.

3. The image processing apparatus recited in claim 1, wherein the data processing corresponds to print processing, and the one or more process conditions correspond to a print condition.

4. The image processing apparatus recited in claim 1, further comprising:
a selector that allows the user to select whether with or without a linkage to the at least one of the registered process conditions, the identification information should be generated and displayed thereon.

5. The image processing apparatus recited in claim 1, wherein the display displays on itself, the identification information and details of the at least one of the registered process conditions that is linked to the identification information.

6. The image processing apparatus recited in claim 1, wherein a name is given to each process condition, and the display displays on itself, the identification information and a name of the at least one of the registered process conditions that is linked to the identification information.

7. The image processing apparatus recited in claim 1, wherein a process condition is registered for each user, and the identification information generator generates identification information and links the identification information to a process condition that is registered for a login user.

8. An image processing method of an image processing apparatus, comprising:
registering one or more than one process conditions under which data processing is performed;
generating identification information for at least one of the registered process conditions and also linking the identification information to the at least one of the registered process conditions, before establishing a connection between a user's portable terminal and an image processing apparatus in order to enable them to communicate with each other, wirelessly;
displaying on a display, the generated identification information in a style that allows users to understand its linkage to the at least one of the registered process conditions;
establishing a connection between the portable terminal and the image processing apparatus, if identification information entered by the user via the portable terminal received therefrom is equivalent to the displayed generated identification information; and
performing data processing on the data to be processed, which is received from the portable terminal having been connected to the image processing apparatus, or which is obtained according to storage information received from the portable terminal, under the at least one of the registered process conditions that is linked to the displayed identification information used for establishment of the connection.

9. The image processing method recited in claim 8, wherein the wireless communication is performed by using Bluetooth, and the identification information corresponds to a PIN code.

10. The image processing method recited in claim 8, wherein the data processing corresponds to print processing, and the at least one of the registered process conditions corresponds to a print condition.

11. The image processing method recited in claim 8, further comprising:
selecting according to user instruction, whether with or without a linkage to the at least one of the registered process conditions, the identification information should be generated and displayed on the display.

12. The image processing method recited in claim 8, wherein the identification information and details of the at least one of the registered process conditions that is linked to the identification information are displayed on the display.

13. The image processing method recited in claim 8, wherein a name is given to each process condition, and the identification information and a name of the at least one of the registered process conditions that is linked to the identification information are displayed on the display.

14. The image processing method recited in claim 8, wherein a process condition is registered for each user, and identification information is generated and linked to a process condition that is registered for a login user.

15. An image processing program recorded in a non-transitory computer readable recording medium to make a computer of an image processing apparatus execute:
registering one or more than one process conditions under which data processing is performed;
generating identification information for at least one of the registered process conditions and also linking the identification information to the at least one of the registered process conditions, before establishing a connection between a user's portable terminal and an image processing apparatus in order to enable them to communicate with each other, wirelessly;
displaying on a display, the generated identification information in a style that allows users to understand its linkage to the at least one of the registered process conditions;
establishing a connection between the portable terminal and the image processing apparatus, if identification information entered by the user via the portable terminal received therefrom is equivalent to the displayed generated identification information; and
performing data processing on the data to be processed, which is received from the portable terminal having been connected to the image processing apparatus, or which is obtained according to storage information received from the portable terminal, under the at least one of the registered process conditions that is linked to the displayed identification information used for establishment of the connection.

16. The image processing program recited in claim 15, wherein the wireless communication is performed by using Bluetooth, and the identification information corresponds to a PIN code.

17. The image processing program recited in claim 15, wherein the data processing corresponds to print processing, and the at least one of the registered process conditions corresponds to a print condition.

18. The image processing program recited in claim 15, further making the computer execute:
selecting according to user instruction, whether with or without a linkage to the at least one of the registered process conditions, the identification information should be generated and displayed on the display.

19. The image processing program recited in claim 15, wherein the identification information and details of the at least one of the registered process conditions that is linked to the identification information are displayed on the display.

20. The image processing program recited in claim 15, wherein a name is given to each process condition, and the identification information and a name of the at least one of the registered process conditions that is linked to the identification information are displayed on the display.

21. The image processing program recited in claim 15, wherein a process condition is registered for each user, and identification information is generated and linked to a process condition that is registered for a login user.

22. The image processing apparatus recited in claim 1, wherein the display displays the generated identification information prior to the establishment of the connection with the portable terminal.

23. The image processing method recited in claim 8, wherein the generated identification information is displayed on the display prior to the establishment of the connection between the portable terminal and the image processing apparatus.

24. The image processing program recited in claim 15, wherein the generated identification information is displayed on the display prior to the establishment of the connection between the portable terminal and the image processing apparatus.

25. The image processing apparatus recited in claim 1, wherein the display displays the generated identification information together with a descriptor of the at least one of the registered process conditions.

26. The image processing method recited in claim 8, wherein the generated identification information is displayed on the display together with a descriptor of the at least one of the registered process conditions.

27. The image processing program recited in claim 15, wherein the generated identification information is displayed on the display together with a descriptor of the at least one of the registered process conditions.

* * * * *